(12) United States Patent
Chen et al.

(10) Patent No.: US 9,323,449 B2
(45) Date of Patent: Apr. 26, 2016

(54) ELECTRONIC APPARATUS AND DRAWING METHOD USING THE SAME

(71) Applicant: HTC Corporation, Taoyuan, Taoyuan County (TW)

(72) Inventors: Ying-Chung Chen, Taoyuan (TW); Huei-Long Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 85 days.

(21) Appl. No.: 14/274,260

(22) Filed: May 9, 2014

(65) Prior Publication Data

US 2015/0324084 A1 Nov. 12, 2015

(51) Int. Cl.
*G06F 3/0488* (2013.01)

(52) U.S. Cl.
CPC .................................. *G06F 3/0488* (2013.01)

(58) Field of Classification Search
CPC .... G06F 3/0488; G06F 3/0412; G06F 1/1626
See application file for complete search history.

(56) References Cited

U.S. PATENT DOCUMENTS

| | | | |
|---|---|---|---|
| 2010/0277505 A1 | 11/2010 | Ludden et al. | |
| 2011/0271281 A1 | 11/2011 | Mandryk | |
| 2011/0310094 A1* | 12/2011 | Park | G06F 1/1626 345/419 |
| 2012/0223894 A1* | 9/2012 | Zhao | G06F 3/0488 345/173 |
| 2014/0053086 A1* | 2/2014 | Kim | H04L 65/403 715/753 |
| 2014/0078087 A1* | 3/2014 | Ho | G06F 3/0412 345/173 |
| 2014/0125621 A1* | 5/2014 | Yamada | G06F 1/1626 345/173 |

* cited by examiner

*Primary Examiner* — Andrew Sasinowski
(74) *Attorney, Agent, or Firm* — Birch, Stewart, Kolasch & Birch, LLP

(57) ABSTRACT

Drawing methods of an electronic apparatus having a touch screen are provided. A touch event of an input tool is first detected by the touch screen. Then, the touch positions for the touch event are obtained and a predicted position is determined based on a current touch position and at least one historical touch position of the touch event. Thereafter, an icon is drawn on the touch screen at the predicted position.

14 Claims, 4 Drawing Sheets

ELECTRONIC APPARATUS AND DRAWING METHOD USING THE SAME

BACKGROUND OF THE INVENTION

1. Field of the Invention

The disclosure relates generally to electronic apparatuses and drawing methods thereof, and more particularly, to electronic apparatuses having a touch screen and drawing methods thereof suitable for performing position prediction on a traced object.

2. Description of the Related Art

Driven by user requirements, more and more electronic apparatuses are equipped with touch screens or touch panels, especially handheld or portable electronic apparatuses such as smartphones, personal digital assistants (PDAs), tablet PCs, or Ultra Mobile PCs (UMPCs). The touch screen or touch panel can sense contacts directly or indirectly placed by users and therefore be used as one of the main input devices. Electronic apparatuses with touch panels allow users to generate a touch event by using their fingers or styluses to input a selection or move an object on the screen. The touch panels can then identify the touch event and the touch position on the display screen of the touch panel on which the touch event occurs and perform responsive operations based on the touch event.

However, there may be a delay between user input and visual feedback to the user. For example, when a user drags an icon around the touch screen, because the framework needs to take some processes from receiving of the touch signal to displaying of corresponding content on the touch screen, the user may find that the icon being dragged is not exactly under his fingers, instead, it may sort of following the fingers with delay. Those processes may take some latency. As a result, when the user finally sees the icon displayed on the touch screen, his finger may already leave the drawing position. Thus, there is always a gap between the draw displayed and the finger.

BRIEF SUMMARY OF THE INVENTION

Electronic apparatuses having a touch screen and drawing methods using the same are provided.

In an embodiment of a drawing method of an electronic apparatus having a touch screen, a touch event for an input tool is detected by the touch screen. Then, the touch positions for the touch event are obtained in which the touch positions corresponding to positions for drawing an icon on the touch screen, and a predicted position is determined based on a current touch position and at least one historical touch position of the touch event. Thereafter, the icon is drawn on the touch screen at the predicted position.

An embodiment of an electronic apparatus comprises a touch screen, a filter unit, a prediction unit and a drawing module. The touch screen is arranged for detecting a touch event for an input tool by the touch screen. The filter unit which is coupled to the touch screen is arranged for obtaining touch positions of the touch event, the touch positions corresponding to positions for drawing an icon on the touch screen. The prediction unit is also coupled to the filter unit and is arranged for determining a predicted position based on a current touch position and at least one historical touch positions of the touch event. The drawing module which is coupled to the prediction unit and the touch screen is arranged for drawing the icon on the touch screen at the predicted position.

Drawing methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide an electronic apparatus with a touch screen and related drawing method thereof, wherein motion tracking models are utilized to monitor/track the user finger and predict the user finger position in a predetermined period of time (e.g. t million seconds) later and then starts to draw an icon on the predicted position. After the predetermined period of time, the finger supposed to move onto the predicted position, where the icon shows up at the same time, thus providing more accuracy of prediction and providing a more intuitive touch operation of the electronic apparatus for users.

Figure 1:
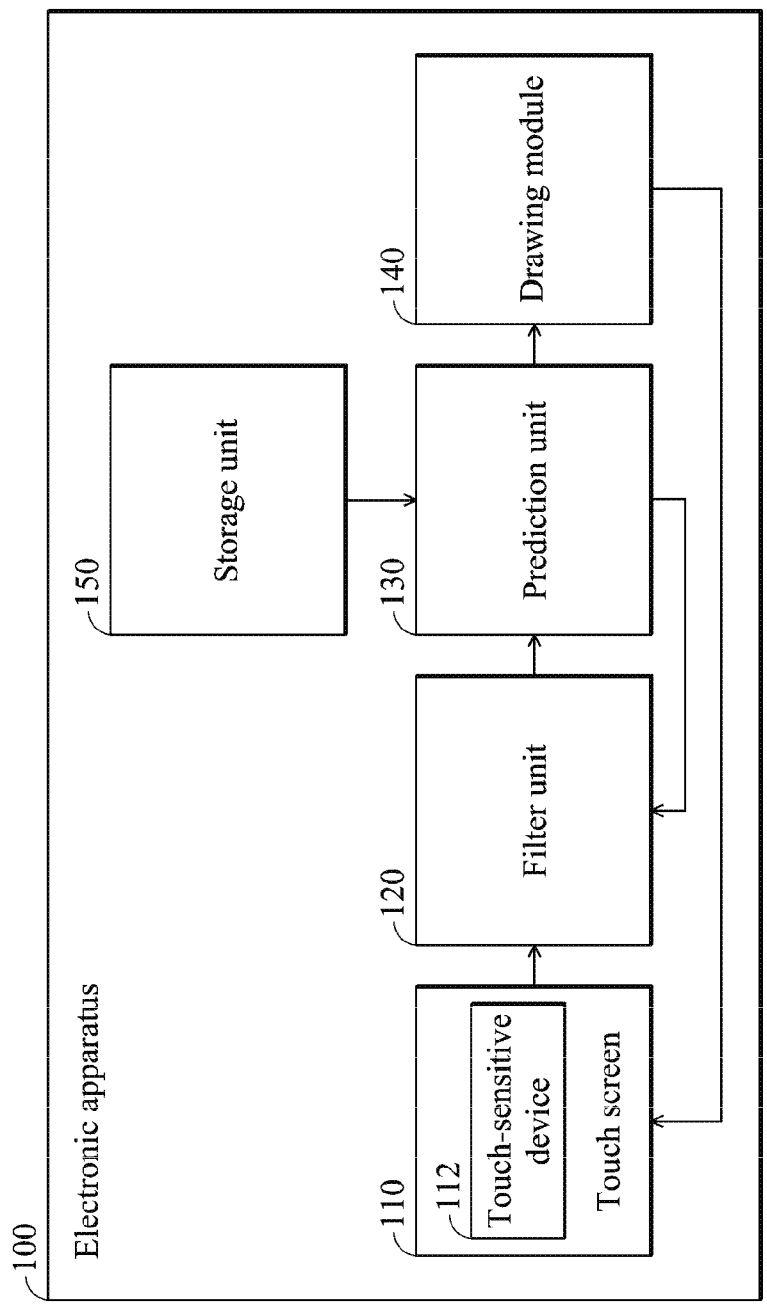
FIG. 1 is a schematic diagram illustrating an embodiment of an electronic apparatus of the invention.

FIG. 1 is a schematic diagram illustrating an embodiment of an electronic apparatus of the invention. The electronic apparatus 100 may be a personal computer or a portable device, such as a Mobile Internet Device (MID), a laptop computer, a Netbook, or any other type of handheld device. However, it is to be understood that the invention is not limited thereto. The electronic apparatus 100 may at least comprise a touch screen 110, a filter unit 120, a prediction unit 130, a drawing module 140 and a storage unit 150. The touch screen 110 may be arranged for receiving inputs by users. The users may send inputs by operations performed on the touch screen 110. It is understood that, in this embodiment, the touch screen 110 may be integrated with a touch-sensitive device (e.g. a touch sensor) 112. The touch-sensitive device 112 has a touch-sensitive surface comprising sensors in at least one dimension to detect touch and movement of at least one input tool, such as a pen/stylus or finger near or on the touch-sensitive surface, so as to allow the users to send touch inputs via the input tool (e.g. a pen/stylus or finger).

The filter unit 120 is arranged for receiving the touch input data of the touch event detected by the touch-sensitive device 112 and obtaining touch positions of the touch event according to the touch input data, in which the touch positions corresponding to positions for drawing an icon on the touch screen. For example, the filter unit 120 may utilize the motion tracking model and related motion tracking technology to monitor/track traced object (e.g. movement of the input tool) trajectory to continuously monitor its positions during a predetermined period of time to obtain a moving direction of the traced object and then obtain an acceleration parameter of the traced object. The obtained moving direction and acceleration parameter of the traced object may further be used to estimate a moving distance for the traced object. With the filter unit 120, the moving trajectory of the traced object may be obtained more precisely.

In one embodiment, the filter unit 120 may comprise a Kalman filter, which is an optimal recursive Bayesian filter for linear functions subjected to Gaussian noise. In another embodiment, the filter unit 120 may comprise a particle filter, which is a filter for sampling the underlying state-space distribution of non-linear and non-Gaussian processes. In some embodiments, the filter unit 120 may comprise two or more types of filters and the filter unit 120 further comprises a switch device for switching between the filters according to the trajectory type of the input tool.

Figure 2:
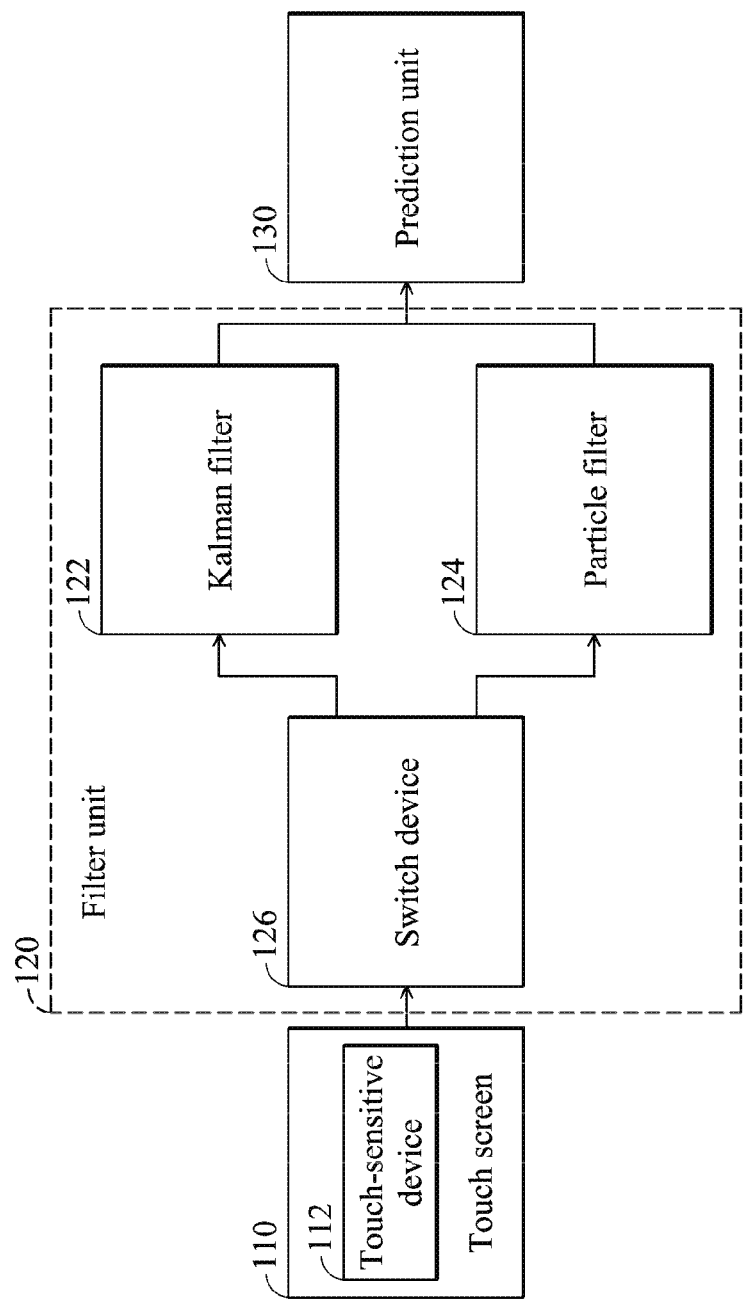
FIG. 2 is a schematic diagram illustrating an embodiment of a filter unit of the invention.

FIG. 2 is a schematic diagram illustrating an embodiment of a filter unit shown in FIG. 1 of the invention. As shown in FIG. 2, the filter unit 120 may comprise a Kalman filter 122, a particle filter 124 and a switch device 126, wherein the Kalman filter 122 is arranged for prediction of linear movement and the particle filter 124 is arranged for prediction of non-linear movement. The switch device 126 can switch the filter unit 120 to the Kalman filter 122 when performing a linear prediction for the traced object with linear movement, or switch to the particle filter 124 when performing a non-linear prediction for the traced object with non-linear movement. For example, the Kalman filter 122 may be utilized to sample and generate a plurality of estimations according to the touch positions of the touch event in response to that the touch event indicates that the user finger moves along a linear path, while the particle filter 124 may be utilized to sample and generate a plurality of estimations according to the touch positions for the touch event in response to that the touch event indicates that the user finger moves along a curve or the like. In some embodiments, the switch device 126 may further determine whether the touch event corresponds to a linear movement event or a non-linear movement event, and then determine to utilize the Kalman filter 122 in response to determining that the touch event corresponds to the linear movement event and determine to utilize the particle filter 124 in response to determining that the touch event corresponds to the non-linear movement event.

The particle filter 124 is mainly used to generate a plurality of estimations (e.g. position or displacement estimations for the touch points of the touch event).

For example, in one embodiment, to generate a single sample x at k from particle $Px_k|y_{1:k}(x|y_{1:k})$, following steps are performed by the particle filter 124:

(1) Set n=0 (which will count the number of generated particles);

(2) Uniformly chose an index L from the range $\{1, \ldots, P\}$;

(3) Generate a test $\hat{x}$ from the distribution $Px_k|x_{k-1}(x|x_{k-1|k-1}^{(L)})$, wherein x and y represent the coordinate of the touch position of a detected touch point in two-dimension;

(4) Generate the probability of $\hat{y}$ using $\hat{x}$ from $Py|x(y_k|\hat{x})$ where $y_k$ is the measured value;

(5) Generate another uniform u from $[0,m_k]$;

(6) Compare u and $P(\hat{y})$, wherein the procedure repeats from step (2) if u is larger than $P(\hat{y})$ and save $\hat{x}$ as $x_{k|k}^{(p)}$ and increment n if u is smaller than $P(\hat{y})$; and (7) If n==P, quit.

The storage unit 150 can be arranged for recording the touch position information of historical touch input signals and the position predictions corresponding to the object. For example, the storage unit 150 may be any kinds of known memories, hard disks, portable disks or other storage mediums, but it is not limited thereto.

The prediction unit 130 is coupled to the filter unit 120 and is arranged for determining/calculating a predicted position based on the touch input data (e.g. the touch positions for the touch event) obtained by the filter unit 120 and previous position data stored in the storage unit 150. The drawing module 140 is coupled to the prediction unit 130 and the touch screen 110, and is arranged for performing a drawing function which provides applications to display/draw data (e.g. an icon) on the touch screen 110 based on the historical position information and predicted position information.

The electronic apparatus 100 can perform the drawing method of the present invention, which will be discussed further in the following paragraphs.

Figure 3:
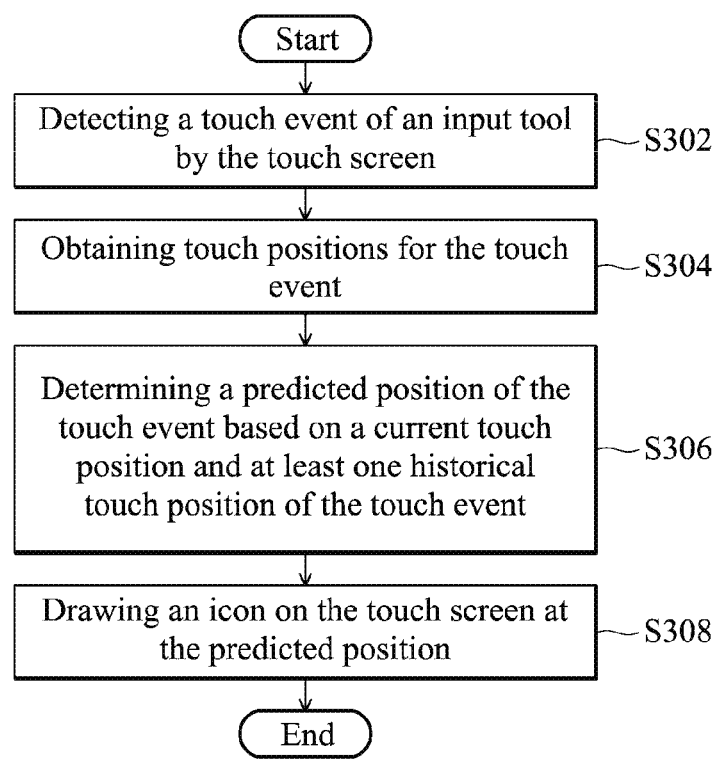
FIG. 3 is a flowchart of an embodiment of a drawing method of an electronic apparatus of the invention.

FIG. 3 is a flowchart of an embodiment of a drawing method of an electronic apparatus of the invention. Please refer to FIGS. 1 and 3. The drawing method can be applied to the electronic apparatus 100 for drawing an icon according to touch inputs of a touch event.

First, in step S302, when a user performs a dragging operation on the touch screen 110 via an input tool, such as a pen/stylus or his (her) finger(s), the touch screen 110 detects a touch event of the input tool. To be more specific, the touch-sensitive device 112 of the touch screen 110 can detect touch and movement of the user finger near or on the touch-sensitive surface to detect a touch event of the user finger, and provide touch information regarding the touch points to the filter unit 120.

Then, in step S304, in response to detecting the touch event, the filter unit 120 obtains one or more touch positions for the touch event. In this step, the filter unit 120 may utilize the motion tracking model and related motion tracking technology provided by the Kalman filter or the particle filter to monitor/track traced object (e.g. movement of the input tool) trajectory to continuously monitor the positions of the traced object during a predetermined period of time to obtain a moving direction of the traced object and then obtain acceleration parameter of the traced object. The obtained moving direction and acceleration parameter of the traced object may further be used to estimate a moving distance for the traced object.

Similarly, in some embodiments, the filter unit 120 may further comprise a Kalman filter 122, a particle filter 124 and a switch device 126. The switch device 126 may further determine whether the touch event corresponds to a linear movement event or a non-linear movement event, and determine to utilize the Kalman filter 122 in response to determining that the touch event corresponds to the linear movement event and determine to utilize the particle filter 124 using the aforementioned steps in response to determining that the touch event corresponds to the non-linear movement event.

Thereafter, in step S306, the prediction unit 130 determines a predicted position for next movement of the input tool based on the touch positions of the touch event obtained by the filter unit 120 and touch positions corresponding to previous historical touch events stored in the storage unit 150. For example, the prediction unit 130 may utilize current detected touch position of the touch event and previously detected touch position of the touch event with a filtering algorithm to determine a predicted position for next movement of the user finger.

After the predicted position has been obtained, in step S308, the drawing module 140 draws an icon on the touch screen 110 at the predicted position. By doing so, the input tool (e.g. the user finger) is supposed to move onto the predicted position, and the icon shows up at the predicted position at the same time, thus reducing the latency between the user input and visual feedback to the user.

Figure 4A:
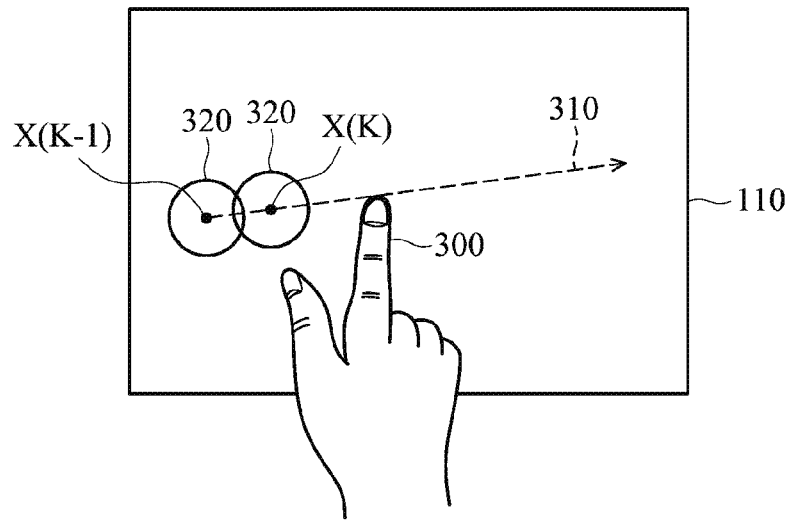
FIGS. 4A and 4B are schematic diagrams illustrating embodiments of operations of touch events of the invention.
Figure 4B:
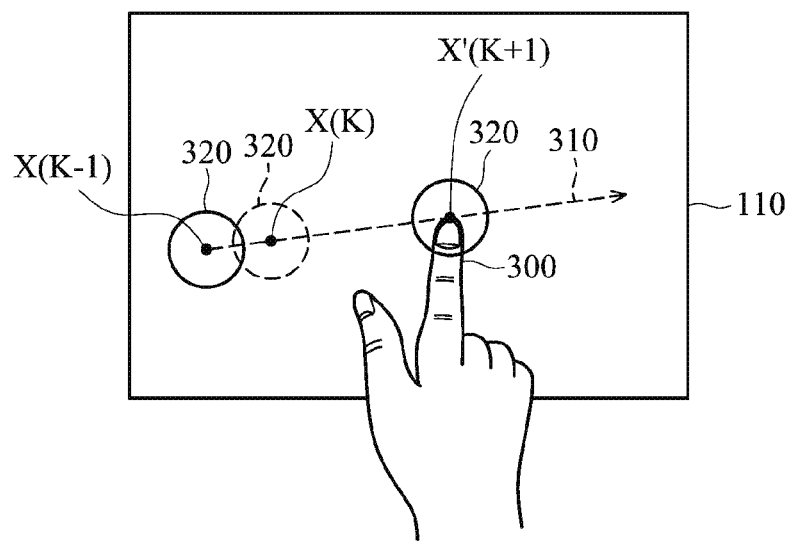

For example, please refer to FIGS. 4A and 4B which are schematic diagrams illustrating embodiments of operations of touch events of the invention. As shown in FIG. 4A, when a user drags an icon 320 around the touch screen 110 along a moving path 310 by his finger 300, because the electronic apparatus 100 needs to take some processes from receiving of the touch signal to the display on the touch screen 110, the user may see that the position of the drawn icon 320 is not exactly under the position of his finger 300. In this case, when the user finally sees the icon 320 displayed on the touch screen 110, his finger may already leave the drawing position X(K). Thus, there is a gap between the drawn icon 320 displayed at the position X(K) and the finger 300.

As shown in FIG. 4B, according to the present invention, when the user drags the icon 320 around the touch screen 110 along the moving path 310 by the finger 300, the touch screen 110 detects a touch event for the finger 300 and then the filter unit 120 obtains one or more touch positions (e.g. the positions X(K−1) and X(K−2)) for the touch event using the Kalman filter due to that the touch event corresponds to a linear movement event in this embodiment. The prediction unit 130 then determines a predicted position X'(K+1) for next movement of the finger 300 based on the current touch position X(K) and previous touch position X(K−1). In other embodiments of the invention, the prediction unit 130 may determine the prediction position X'(K+1) based on the current touch position X(K) and previous touch positions X(K−1) and X(K−2). It should be noted that the prediction unit 130 may decide to reference any predetermined number of previous touch positions depending on prediction accuracy and processing efficiency. After the predicted position X'(K+1) has been obtained, the drawing module 140 draws the icon 320 on the touch screen 110 at the predicted position X'(K+1), instead of received current position X(K). By doing so, the input tool (e.g. the finger 300) is supposed to move onto the predicted position X'(K+1), and the icon 320 may show up at the same position at the same time as shown in FIG. 4B.

In some embodiments, upon obtaining touch positions of the touch event, a modification procedure may further be performed by the prediction unit 130 for adjusting the predicted position based on the touch positions of the touch event in response to the positions of at least two of the touch points which have been continuously detected remaining unchanged and having no movement.

In some embodiments, the modification procedure may further be performed for adjusting the predicted position based on the touch positions for the touch event in response to a difference between the touch positions of the touch event and the predicted position being larger than a predetermined threshold value. For example, the modification procedure will be not performed in the condition that a difference between the touch positions of the touch event and the predicted position is smaller than or equal to 5%. And the modification procedure will be performed for adjusting the predicted position based on the touch positions for the touch event in the condition that the difference between the touch positions of the touch event and the predicted position is larger than 5%.

In some embodiments, to avoid occurrence of flickering screen, the drawing function for drawing the icon on the touch screen is forbidden to be performed until the modification procedure has been completed for a predetermined period of time (e.g. after the modification has been completed for t million seconds). For example, upon completion of the modification procedure, the drawing module 140 may first disable the drawing function and then re-enable the drawing function after t million seconds later for drawing the icon on the touch screen 110 so that the occurrence of flicker can be avoided.

Therefore, the electronic apparatus with a touch screen and related drawing method of the invention can utilize the motion tracking model and related motion tracking technology to monitor/track the user finger trajectory, predict the subsequent position of the finger input and draw an icon on the predicted position, thus reducing the reaction time between fast-moving finger input and display output, and providing users with preferred touch-using experience.

Drawing methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A drawing method for use in an electronic apparatus comprising a touch screen, comprising:
    detecting a touch event of an input tool by the touch screen;
    obtaining touch positions of the touch event, the touch positions corresponding to positions for drawing an icon on the touch screen;
    determining a predicted position of the touch event based on a current touch position and at least one historical touch position of the touch event;
    drawing the icon on the touch screen at the predicted position;
    determining whether the touch event corresponds to a linear movement event; and
    utilizing a particle filter to determine the predicted position according to the touch positions in response to determining that the touch event corresponds to a non-linear movement event.

2. The drawing method of claim 1, further comprising:
    utilizing a Kalman filter to determine the predicted position according to the touch positions in response to determining that the touch event corresponds to the linear movement event.

3. The drawing method of claim 2, further comprising:
    utilizing a switch device to switch between the particle filter and the Kalman filter.

4. The drawing method of claim 3, further comprising:
    performing a modification procedure for adjusting the predicted position based on the touch positions of the touch event in response to the positions of at least two consecutive touch points remaining unchanged and the two touch consecutive points having no movement.

5. The drawing method of claim 3, further comprising:
performing a modification procedure for adjusting the predicted position based on the touch positions of the touch event in response to a difference between at least one touch position of the touch event and corresponding predicted position being larger than a predetermined threshold value.

6. The drawing method of claim 3, further comprising:
forbidding drawing the icon on the display unit until the modification procedure has been completed for a predetermined period of time.

7. An electronic apparatus, comprising:
a touch screen, configured for detecting a touch event of an input tool by the touch screen;
a filter unit, coupled to the touch screen, configured for obtaining touch positions of the touch event, the touch positions corresponding to positions for drawing an icon on the touch screen;
a prediction unit, coupled to the filter unit and the touch screen, configured for determining a predicted position based on a current touch position and at least one historical touch position of touch event; and
a drawing module, coupled to the prediction unit, configured for drawing the icon on the touch screen at the predicted position,
wherein the filter unit further comprises a particle filter, and the filter unit further determines whether the touch event corresponds to a linear movement event and determines to utilize the particle filter to determine the predicted position according to the touch positions in response to determining that the touch event corresponds to a non-linear movement event.

8. The electronic apparatus of claim 7, wherein the filter unit further comprises a Kalman filter, and the filter unit further determines to utilizes the Kalman filter to determine the predicted position according to the touch positions in response to determining that the touch event corresponds to the linear movement event.

9. The electronic apparatus of claim 8, wherein the filter unit further comprises a switch device to switch between the particle filter and the Kalman filter.

10. The electronic apparatus of claim 8, wherein the prediction unit further performs a modification procedure for adjusting the predicted position based on the touch positions for the touch event in response to the positions of at least two consecutive touch points remaining unchanged and the two consecutive touch points having no movement.

11. The electronic apparatus of claim 8, wherein the prediction unit further performs a modification procedure for adjusting the predicted position based on the touch positions for the touch event in response to a difference between at least one touch position of the touch event and corresponding predicted position being larger than a predetermined threshold value.

12. The electronic apparatus of claim 11, wherein the drawing module further forbids drawing the icon on the touch screen until the modification procedure has been completed for a predetermined period of time.

13. The electronic apparatus of claim 7, wherein the touch screen further comprises a touch-sensitive device for detecting the touch event.

14. A non-transitory machine-readable storage medium comprising a computer program, which means for driving an electronic apparatus having a touch screen to perform a drawing method, and the drawing method comprises the steps of:
detecting a touch event of an input tool by the touch screen;
obtaining touch positions of the touch event, the touch positions corresponding to positions for drawing an icon on the touch screen;
determining a predicted position based on a current touch position and at least one historical touch position of the touch event;
drawing the icon on the touch screen at the predicted position;
determining whether the touch event corresponds to a linear movement event; and
utilizing a particle filter to determine the predicted position according to the touch positions in response to determining that the touch event corresponds to a non-linear movement event.

* * * * *